ary and the excess hydrolyzing medium is combined...

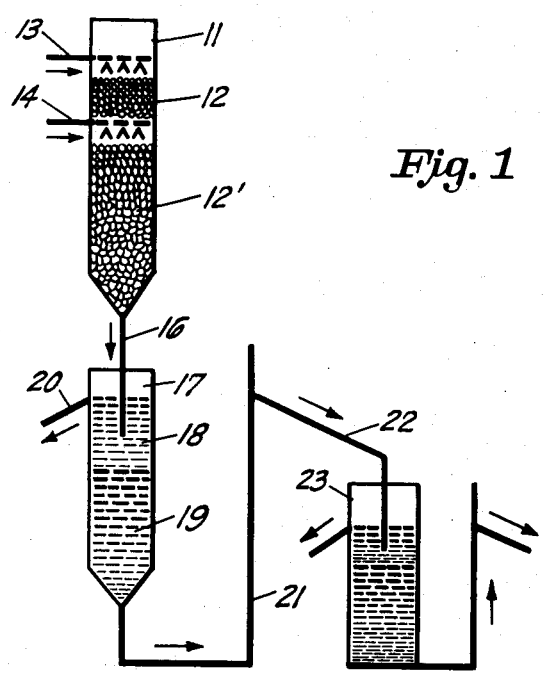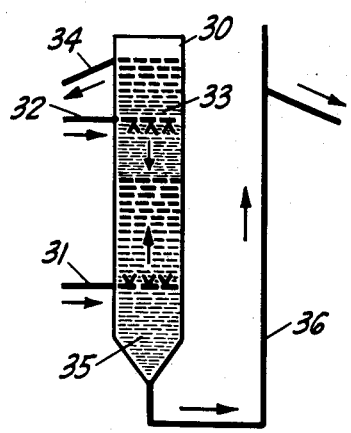

United States Patent Office

2,719,859
Patented Oct. 4, 1955

2,719,859

METHOD FOR THE HYDROLYSIS OF ORGANOSILICON COMPOUNDS

Siegfried Nitzsche, Burghausen, Upper Bavaria, Eduard Kalb, Munich, and Sebastian Fellermeier, Burghausen, Upper Bavaria, Germany, assignors, by mesne assignments, to Wacker-Chemie G. m. b. H., Munich, Germany Application September 17, 1951, Serial No. 246,966

Claims priority, application Germany September 21, 1950

6 Claims. (Cl. 260—448.2)

The present invention relates to the production of organosiloxanes, and particularly involves a method of hydrolyzing hydrolyzable organosilanes to produce organosiloxanes.

Heretofore the usual method of hydrolyzing organosilanes with water has been by batch processing in liquid phase. This has led to a number of difficulties in regulation of the reaction conditions and consequently in standardization of the product. For example, when organohalosilanes are being hydrolyzed in a batchwise process, the concentration of halogen acid dissolved in the hydrolyzing medium steadily increases as the hydrolysis proceeds. This leads to conditions toward the end of the hydrolysis which are far different from the conditions prevailing at the beginning of the hydrolysis, and consequently leads to a number of variations in the properties of the product. Also the gross output of a batchwise apparatus is not high, since much time is lost in emptying and filling the apparatus and in allowing the reaction product to separate from the hydrolysis medium.

An object of the present invention is to provide an improved process for hydrolyzing hydrolyzable organosilanes, which process yields an improved product with consistent properties. Other objects and advantages will be apparent from the following description.

In accordance with the present invention the hydrolysis of the hydrolyzable organosilanes is effected by continuously introducing the liquid hydrolyzable organosilane in a finely dispersed condition into an excess of a continuously and downwardly flowing stream of the liquid aqueous hydrolyzing medium. Thus the organosilane, the organosiloxane produced, and the excess hydrolyzing medium flow concurrently and downwardly through the liquid contact zone.

In the accompanying drawing Fig. I is a diagrammatic flow sheet illustrating the hydrolysis and separation steps for the present invention. Fig. II is a flow sheet illustrating the continuous washing of the hydrolyzed product.

In Fig. I a tower 11 contains packed section 12 and 12'. The packing is any of the suitable well known materials, and is preferably acid resistant, such as for example ceramic Raschig rings. The two packed sections are shown as separated sections only for purposes of clarity of illustration, and it is to be understood that they may comprise continuous and contacting sections. The upper section serves as a contact zone in which any volatiles from the lower section are reacted with the downwardly flowing hydrolyzing medium. The lower section serves as a contact zone for the liquid organosilanes and hydrolyzing medium. An excess of the aqueous hydrolyzing medium is fed continuously through inlet 13 into packed section 12. The organosilane is continuously fed into inlet 14 and emitted in the form of a finely dispersed spray from any suitable spraying device. Reaction of the silane with the aqueous hydrolyzing medium takes place in packed section 12'. The mixture of hydrolyzed material and excess hydrolyzing medium flows concurrently and downwardly to outlet 16 and into a separating vessel 17, where the hydrolyzate and hydrolyzing medium separate into two layers 18 and 19. The upper and lighter layer 18 is withdrawn from an overflow outlet 20. The lower layer 19 flows through an outlet 21, which may be adjustable to regulate the height of the separated layer 18. If desired, layer 19 then flows through conduit 22 into a second settling tank 23 in order to separate out any entrained product. The process is ordinarily conducted in such a manner that the lighter layer 18 comprises the organosiloxane product. However, if desired, an organic solvent which is heavier than the hydrolyzing medium may be employed in the process, in which case the relative positions of the product layer and of the excess hydrolyzing medium are reversed.

The organosiloxane product obtained from this hydrolysis may then be fed in the form of a spray into a countercurrent washing apparatus 30 through inlet 31 and emitted as a spray from any suitable device. Wash-water which may contain small amounts of material such as alkali or $NaHCO_3$, enters through inlet 32, preferably as a spray. The washed organosiloxane moves upwardly and separates into layer 33, from which it overflows through outlet 34. The wash-water moves downwardly, settles into layer 35, and flows through an adjustable outlet 36, which is adjustable to regulate the height of the separated layer 33. Solvents which are lighter than water and which are capable of dissolving the organosiloxane may be employed if desired in order to expedite the separation. Of course, if a heavy solvent for the siloxane has been employed which makes the product solution heavier than the wash-water, the procedure and direction of flow is the reverse of that described above.

In the hydrolysis step, instead of a packed tower any other device may be used which makes possible the contacting of a finely divided liquid silane with a liquid aqueous hydrolyzing medium in the described manner. If desired, several continuous washing devices may be arranged in series and the product washed, for example, first with an alkaline solution and then with water. As stated previously, in order to simplify the separation of the product from the wash-water, one can raise or lower the specific gravity of the product by the use of suitable solvents.

By means of the process of this invention, pure hydrolyzed organosiloxanes can be obtained continuously. The regulation of the reaction is much less difficult than heretofore, since the heat of the reaction is continuously dispersed by the flow of fresh hydrolyzing medium and the pH of the reaction portion of the system remains consistent throughout the reaction. Regulation of the flow of the aqueous hydrolyzing medium or of the silanes can be used to regulate the reaction temperature. This reaction temperature should be maintained below the boiling point of the organosilanes and the hydrolyzing medium present.

The organosilanes employed in the present invention may be pure species or mixtures of silanes. Any mixture of silanes used may contain silanes with no organic groups attached to the silicon, such as $SiCl_4$, $Si(OC_2H_5)_4$, and the like if desired, but the average degree of substitution of the silane mixture (i. e. the number of organic groups attached to Si per Si atom) must be high enough so that the resulting hydrolyzate, if not a liquid in itself, is at least soluble in some organic solvent.

The organosilanes or mixtures of silanes which may be hydrolyzed have the general formula $R_nSiX_{4-n}$ where $n$ preferably has an average value of from about 0.5 to 3 inclusive, R is an organic radical, such as for example an alkyl, aryl, cycloalkyl, aralkyl, alkaryl or halogenated aryl radical, and X is a hydrolyzable substituent. The preferred silanes are those in which X is a halogen atom such as chlorine or bromine or an alkoxy radical. Preferably R is an alkyl or monocyclic aryl radical. It is to be understood, however, that the process of this invention is applicable to all readily hydrolyzable organosilanes, regardless of the nature of the organic substituents or of the hydrolyzable substituents. When the average value of $n$ is between about 1.9 and 3 the products obtained are fluid and hence a diluent is not particularly necessary, although such may be used if desired. When the average value of $n$ is between about 0.5 and 1.9, however, resinous materials may be produced and consequently a diluent such as any of the organic solvents capable of dissolving the resinous product should be present. Such solvents can be added to the organosilane prior to hydrolysis.

The hydrolyzing medium can be water alone, or if desired a mixture of water and diluents can be employed. When alkoxysilanes are being hydrolyzed, it is preferable that a catalyst for the hydrolysis, such as $H_2SO_4$, be added to the hydrolysis medium.

The hydrolyzing medium is introduced at a rate such that the amount of water available for reaction in the reaction zone is well in excess of the total of the theoretical amount necessary for complete hydrolysis of the organosilanes, plus the amount necessary to dissolve the evolved halogen acid if a halosilane is being employed.

The process of the present invention has been found to be particularly suitable for the hydrolysis of organochlorosilanes, especially materials such as dimethyldichlorosilane, and other methyl, phenyl, and phenylmethyl substituted mono-, di- and trichlorosilanes and mixtures thereof.

The products of this invention are of well known utility. The resinous materials are used as insulating varnishes, water repellents, molding and laminating resins, and the like. The fluids are used as lubricants, hydraulic fluids, damping fluids, etc.

The following examples are illustrative only.

Example 1

When water is continuously fed at a constant rate into the upper end of a vertical column packed with Raschig rings and dimethyldichlorosilane is continuously introduced in the form of a finely dispersed spray at a point in the column below that at which the water is entering, the relative rates of feed being approximately 2 parts water per part silane on a weight basis, and the mixture of hydrolyzed product and aqueous HCl is withdrawn from the bottom of the column, said mixture being separated and the organosiloxane layer washed with a countercurrent stream of water in a continuous washing process, the product obtained is a mixture of cyclics having the general formula $[(CH_3)_2SiO]_x$. In the above formula, $x$ represents an integer of 3 or more. Most of the product obtained is either the cyclic trimer or cyclic tetramer of the above general formula.

Example 2

A mixture containing 95 molar per cent dimethyldichlorosilane and 5 molar per cent trimethylchlorosilane was diluted with an equal volume of toluene. When this diluted mixture is hydrolyzed and washed in the same manner as that described in Example 1, a low viscosity trimethylsiloxy end-blocked dimethylpolysiloxane fluid is obtained.

Example 3

A mixture was made containing 14 molar per cent phenyltrichlorosilane, 14 molar per cent phenyldimethylchlorosilane, 42 molar per cent phenylmethyldichlorosilane, and 30 molar per cent methyltrichlorosilane. This mixture was diluted with twice its weight of toluene and hydrolyzed as in Example 1, the amount of water employed being equal to the total weight of the diluted mixture. The product layer was separated from the aqueous HCl and was washed with water in a continuous countercurrent washing apparatus. This produces a resin which has excellent properties as an electrical insulating varnish. A resinous product produced in this manner is more consistent in its properties than a resin produced from the same mixture of organosilanes but produced in a conventional batchwise process.

That which is claimed is:

1. The process comprising continuously introducing a finely dispersed liquid spray of a hydrolyzable organosilane into the central region of a liquid contact zone, said organosilane having the average general formula $R_nSiX_{4-n}$ where $n$ has an average value of from 0.5 to 3 inclusive, R is an organic radical attached directly to the silicon atom by carbon to silicon linkage, and X is a hydrolyzable substituent, continuously introducing an excess of a liquid aqueous hydrolyzing medium into the upper end of said zone in sufficiently large proportion relative to the organosilane that essentially complete hydrolysis of the organosilane is obtained and an excess of unreacted water is present, whereby the organosiloxane produced, any unreacted organosilane, and the excess hydrolyzing medium flow concurrently and downwardly through the liquid contact zone, the temperature of the hydrolysis reaction being maintained below the boiling point of any of the reactants, and separating the organosiloxane product from the hydrolysis medium.

2. The process of claim 1 in which X is a substituent selected from the group consisting of halogen atoms and alkoxy radicals.

3. The process of claim 1 in which the organosilane is dimethyldichlorosilane.

4. The process of claim 1 in which the organosiloxane is continuously separated from the hydrolysis medium, and is then continuously washed with a countercurrent stream of water in at least one stage of a continuous washing process.

5. The process of claim 1 in which R is selected from the group consisting of alkyl and aryl radicals.

6. The process of claim 1 in which the organosilane consists of a mixture of methyl and phenyl substituted chlorosilanes.

References Cited in the file of this patent

UNITED STATES PATENTS

| | | |
|---|---|---|
| 2,079,511 | Klar et al. | May 4, 1937 |
| 2,154,835 | Eisenlohr | Apr. 18, 1939 |
| 2,483,963 | Barry | Oct. 4, 1949 |
| 2,484,394 | Van Zwet | Oct. 11, 1949 |
| 2,553,845 | Clark | May 22, 1951 |

FOREIGN PATENTS

| | | |
|---|---|---|
| 638,951 | Great Britain | June 21, 1950 |